(12) United States Patent
Cella et al.

(10) Patent No.: US 8,361,587 B2
(45) Date of Patent: Jan. 29, 2013

(54) ENHANCED SECURITY OF OPTICAL ARTICLE

(75) Inventors: James Anthony Cella, Clifton Park, NY (US); David Gilles Gascoyne, Niskayuna, NY (US); Ben Purushotam Patel, Niskayuna, NY (US); Paul Michael Smigelski, Jr., Glenville, NY (US); James Mitchell White, Niskayuna, NY (US); Gregory Allen O'Neil, Clifton Park, NY (US); Andrea Jeannine Peters, Clifton Park, NY (US); Matthew Jeremiah Misner, Delanson, NY (US); Trevor James Dale, Selkirk, NY (US); Whitney Jeanne Olson, Scotia, NY (US); Marc Brian Wisnudel, Glen Rock, NJ (US)

(73) Assignee: NBCUniversal Media, LLC, New York, NY (US)

( * ) Notice: Subject to any disclaimer, the term of this patent is extended or adjusted under 35 U.S.C. 154(b) by 946 days.

(21) Appl. No.: 12/403,739

(22) Filed: Mar. 13, 2009

(65) Prior Publication Data

US 2009/0215620 A1    Aug. 27, 2009

Related U.S. Application Data

(63) Continuation-in-part of application No. 11/831,180, filed on Jul. 31, 2007, now abandoned.

(51) Int. Cl.
*B32B 3/02* (2006.01)
*G11B 7/24* (2006.01)

(52) U.S. Cl. ....... 428/64.4; 428/64.8; 428/913; 428/916

(58) Field of Classification Search .................. 428/64.4, 428/64.8, 913, 916
See application file for complete search history.

(56) References Cited

U.S. PATENT DOCUMENTS

| | | | |
|---|---|---|---|
| 4,374,001 | A | 2/1983 | Bernier |
| 4,444,626 | A | 4/1984 | Bernier et al. |
| 4,918,317 | A | 4/1990 | Hess et al. |
| 5,141,622 | A | 8/1992 | Fauteux et al. |
| 5,451,932 | A | 9/1995 | Wunderlich et al. |
| 5,491,262 | A | 2/1996 | Hung |

(Continued)

FOREIGN PATENT DOCUMENTS

| | | |
|---|---|---|
| WO | 98/40930 A1 | 9/1998 |
| WO | 2004/095447 A1 | 11/2004 |

OTHER PUBLICATIONS

White, Ron, "How Computers Work", Millennium Ed., Que Corporation, Indianapolis, IN. 1999.

(Continued)

*Primary Examiner* — Gerard Higgins
(74) *Attorney, Agent, or Firm* — Fletcher Yoder, P.C.

(57) ABSTRACT

An optical article comprising a primary mark disposed on the optical article and a secondary mark disposed on the optical article in close proximity to the primary mark. The primary mark comprises a first optical-state change material and the secondary mark comprises a second optical-state change material. The optical article is transformed from a pre-activated state to an activated state when a localized authorized activation method is used that selectively activates the primary mark. The optical article is transformed from a pre-activated state to an deactivated state when a non-localized unauthorized activation method is used that activates the secondary mark along with the primary mark resulting in the second optical-state change material undergoing a reverse color change when compared to the first optical-state change material. An optical article with a single mark including multiple color change optical-state change material is also disclosed. Methods of covering and encapsulating the marks are also disclosed.

15 Claims, 5 Drawing Sheets

U.S. PATENT DOCUMENTS

| | | | |
|---|---|---|---|
| 5,559,983 A | 9/1996 | Masood | |
| 5,699,047 A | 12/1997 | Tsai et al. | |
| 5,815,484 A | 9/1998 | Smith et al. | |
| 5,963,536 A | 10/1999 | Vasic et al. | |
| 6,633,853 B2 | 10/2003 | Oshima et al. | |
| 6,790,501 B2 | 9/2004 | van de Grampel et al. | |
| 6,795,464 B2 | 9/2004 | Lawandy | |
| 6,902,111 B2 | 6/2005 | Han et al. | |
| 6,990,671 B1 | 1/2006 | Evans et al. | |
| 7,127,066 B2 | 10/2006 | Solomon et al. | |
| 7,315,946 B1 | 1/2008 | Blumenfeld et al. | |
| 7,444,296 B1 | 10/2008 | Barber et al. | |
| 7,653,919 B2 | 1/2010 | Potyrailo et al. | |
| 2002/0163479 A1 | 11/2002 | Lin et al. | |
| 2004/0022542 A1 | 2/2004 | Atkinson | |
| 2004/0054594 A1 | 3/2004 | Forster et al. | |
| 2004/0120236 A1 | 6/2004 | Suzuki et al. | |
| 2004/0211917 A1* | 10/2004 | Adamovics | 250/474.1 |
| 2005/0110978 A1 | 5/2005 | Potyrailo et al. | |
| 2005/0167510 A1 | 8/2005 | Potyrailo et al. | |
| 2006/0002269 A1 | 1/2006 | Bourget et al. | |
| 2006/0028924 A1 | 2/2006 | Atkinson | |
| 2006/0114755 A1 | 6/2006 | Eklund, II | |
| 2006/0132309 A1 | 6/2006 | Posamentier | |
| 2006/0159266 A1 | 7/2006 | Chavanne et al. | |
| 2006/0177768 A1 | 8/2006 | Tauchi et al. | |
| 2006/0227696 A1 | 10/2006 | Smith et al. | |
| 2006/0234003 A1 | 10/2006 | Selinfreund | |
| 2007/0024948 A1 | 2/2007 | Hirano et al. | |
| 2007/0070867 A1 | 3/2007 | Forster et al. | |
| 2007/0115762 A1 | 5/2007 | Wisnudel et al. | |
| 2007/0116920 A1 | 5/2007 | Krishnan et al. | |
| 2007/0116988 A1 | 5/2007 | Wisnudel et al. | |
| 2007/0143774 A1 | 6/2007 | Agrawal et al. | |
| 2007/0201502 A1 | 8/2007 | Abramson | |
| 2009/0086587 A1 | 4/2009 | White et al. | |
| 2009/0089821 A1 | 4/2009 | White et al. | |
| 2009/0245080 A1 | 10/2009 | White et al. | |
| 2009/0249381 A1 | 10/2009 | White et al. | |
| 2009/0285074 A1 | 11/2009 | Wisnudel et al. | |
| 2009/0285075 A1 | 11/2009 | Wisnudel et al. | |
| 2009/0316565 A1 | 12/2009 | Hershey et al. | |

OTHER PUBLICATIONS

Taylor, J., Johnson, M., Crawford, C.G., "DVD Demystified", 3rd Ed., McGraw-Hill; 2006, Chapter 7-1 to 7-30 and Chapter 9-1 to 9-33. (65 pages).

Labarge, R., "DVD Authoring and Production", CMP Books; 2001, pp. 30-37, 198-221, 452-453. (36 pages).

\* cited by examiner

ENHANCED SECURITY OF OPTICAL ARTICLE

The present patent application is a continuation-in-part application from U.S. patent application Ser. No. 11/831,180, filed Jul. 31, 2007, the disclosure of which is hereby incorporated by reference in its entirety.

BACKGROUND

The invention relates generally to an optical article for playback in a player. More particularly the invention relates to an optical article with an improved security feature.

Shoplifting is a major problem for retail venues and especially for shopping malls, where it is relatively difficult to keep an eye on each customer while they shop or move around in the store. Relatively small objects, such as CDs and DVDs are common targets as they can be easily hidden and carried out of the shops without being noticed. Shops, as well as the entertainment industry, incur monetary losses because of such instances.

Even though closed-circuit surveillance cameras may be located at such places, theft still occurs. Consumer products sometimes are equipped with theft-deterrent packaging. For example, clothing, CDs, audiotapes, DVDs and other high-value items are occasionally packaged along with tags that set off an alarm if the item is removed from the store without being purchased. These tags are engineered to detect and alert for shoplifting. For example, tags that are commonly used to secure against shoplifting are the Sensormatic® electronic article surveillance (EAS) tags based on acousto-magnetic technology. RFID tags are also employed to trace the items on store shelves and warehouses. Other theft-deterrent technologies currently used for optical discs include hub caps for DVD cases that lock down the disc and prevent it from being removed from the packaging until it is purchased, and "keepers" that attach to the outside of the DVD case packaging to prevent the opening of the package until it is purchased. In some cases, retailers have resorted to storing merchandise in locked glass display cases. In other stores, the DVD cases on the shelves are empty, and the buyer receives the actual disc only when purchased. Many of these approaches are unappealing because they add an additional inconvenience to the buyer or retailer, or they are not as effective at preventing theft as desired. Optical storage media, in particular, pose an additional problem in that their packaging and the sensor or anti-theft tags may be easily removed.

Accordingly, there remains a need for an improved solution to the long-standing problem. Point-of-sale (POS) activation reduces retail shrinkage because the optical article, for example a DVD, may not be useful i.e., may not be playable, if removed from the store prior to activation. The methods described herein fill this need by providing a technology for improving the level of security of POS-activated optical media. This technology may make it more difficult for shoplifters to defeat the POS technology.

BRIEF DESCRIPTION

One embodiment of the present disclosure is directed to an optical article. The optical article comprises a primary mark disposed on the optical article and a secondary mark disposed on the optical article in close proximity to the primary mark. The primary mark comprises a first optical-state change material and the secondary mark comprises a second optical-state change material. The optical article is transformed from a pre-activated state to an activated state when a localized authorized activation method is used that selectively activates the primary mark. The optical article is transformed from a pre-activated state to an deactivated state when a non-localized unauthorized activation method is used that activates the secondary mark along with the primary mark resulting in the second optical-state change material undergoing a reverse color change when compared to the first optical-state change material.

Another embodiment of the present disclosure is directed to an optical article. The optical article comprises a mark disposed on the optical article. The mark comprises an optical-state change material that undergoes multiple color changes. The optical article is transformed from a pre-activated state to a first determined activated state when the mark is exposed to an authorized activation signal. The optical article is transformed from a pre-activated state to a second determined deactivated state when the mark is exposed to an unauthorized activation signal.

Yet another embodiment of the present disclosure is directed to an optical article. The optical article comprises a mark disposed on the optical article. The mark comprises an optical-state change material dispersed in a cross linked matrix.

Still yet another embodiment of the present disclosure is directed to an optical article. The optical article comprises a mark disposed on the optical article. The mark comprises a curable optical-state change material.

Still yet another embodiment of the present disclosure is directed to an optical article. The optical article comprises a mark disposed on the optical article. The mark comprises an optical-state change material. The mark is covered with a protective layer.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The invention relates generally to an optical article for playback in a player. More particularly the invention relates to an optical article with an improved security feature. In one embodiment, the improved security feature is such that the optical article is not playable in a player unless it is properly activated. Further, the optical article may be rendered not playable if an unauthorized user attempts to tamper with the security feature.

Approximating language, as used herein throughout the specification and claims, may be applied to modify any quantitative representation that could permissibly vary without resulting in a change in the basic function to which it is related. Accordingly, a value modified by a term or terms, such as "about" is not limited to the precise value specified. In some instances, the approximating language may correspond to the precision of an instrument for measuring the value. Similarly, "free" may be used in combination with a term, and may include an insubstantial number, or trace amounts, while still being considered free of the modified term. The singular forms "a", "an" and "the" include plural referents unless the context clearly dictates otherwise.

One solution to the shoplifting problem, specifically for optical media articles such as DVD's, is to render at least a portion of the content of the DVD inaccessible unless the retailer at the point-of-sale (POS) has activated the DVD. One approach to rendering the content of the DVD inaccessible prior to activation is to employ an ink composition, to deposit a coating composition comprising an optical state change material in or on the DVD, wherein the coating composition at least partially absorbs the incident laser light from an optical data reader so that the complete data directly in the optical path of the laser light cannot be read. The coating composition may be deposited in the form of marks over the data or command containing regions on the optical article. In this instance, the optical article has no value, and therefore there is no incentive for the shoplifter to steal it. However, upon converting the DVD to an "activated" state using an activation signal at the point-of-sale, the coating composition becomes sufficiently transparent, with respect to the wavelength of the laser light employed in the optical data reader, due to a change in the optical properties of the coating composition, and the complete data directly in the optical path of the laser light can now be read by the incident laser light from the optical data reader, therefore rendering the full content of the DVD accessible to a legitimate consumer.

In the following descriptions, the term "opaque" implies that the mark or coating is opaque to the DVD laser at a particular wavelength i.e., substantially absorbs at a particular wavelength such as for example 650 nm (nanometers) i.e., the data below the spot is unreadable by the 650 nm laser. Similarly the term "transparent" implies that the mark or coating is essentially transparent to the DVD laser at a particular wavelength such as for example 650 nm i.e., does not absorb at a particular wavelength such as for example 650 nm. Various methods may be employed for using to enhance the security of an optical article to ensure that the optical article may only be activated by using an authorized source. In various embodiments, the coating composition may be such that an unauthorized source may not be capable of easily activating the optical article. In one embodiment, the unauthorized source may attempt to wipe off or scratch of the coating composition. In another embodiment, the unauthorized source may heat the disc in an oven. The security features described herein are such that these unauthorized methods may render the optical article to a deactivated or an unplayable state.

As used herein, the terms "disposed over" or "deposited over" or "disposed between" refer to both disposed directly in contact with and indirectly by having intervening layers therebetween. "Operably coupled" is a relationship between listed parts that provides a stated function.

As used herein, the term "pre-activated" state of functionality refers to a state of functionality of the optical article where the mark has not yet been exposed to one or more activation signals, while the "activated" state refers to a state of functionality of the optical article where only the right mark has been exposed to an authorized activation signal, and the "incorrectly activated" state refers to a state of functionality of the optical article where the mark or a secondary mark has been exposed to an unauthorized activation signal. In one embodiment, the "pre-activated" state comprises at least one spot which inhibits portions of the optical data layer that are located directly in the optical path of the incident laser light of an optical data reader from being read. The activated state comprises a state of the optical article where the optical data layer can be read by the optical data reader. In one embodiment, the optical state change material is at least partially transparent to the laser from the optical data reader, and does not inhibit the data located directly in the optical path of the laser from being read. In another embodiment, the optical state change material at least partially absorbs light from the laser from the optical data reader and prevents the data directly in the optical path of the laser from being read. As used herein the term "reflectivity" is defined as the ratio of reflected light to incident light.

As used herein the phrase "incorrectly activated" refers to a state of functionality of the optical article when someone tries to activate the optical article by exposing the incorrect sections of the optical article to an activation signal. An unauthorized user who may try to activate the optical article using the activation signal may end up with an incorrectly activated optical article. The phrase incorrectly activate may be construed to mean that the entire data present in the optical article may not be accessible to the illegitimate user. Depending on the manner in which the article is activated by the illegitimate user the article may be incorrectly activated in various ways: (i) the article is damaged and the illegitimate user cannot get any information from the article; (ii) some sections of the article may remain playable but will not provide any useful information to the illegitimate user; or (iii) the user may end up activating the article in the correct manner by using a serendipitous route. In one embodiment, the article may be incorrectly activated by using a wrong activation device by a legitimate user for example a person at the POS, and it may be possible to re-activate the disc by using an authorized activation method.

One embodiment of the present disclosure is directed to an optical article. The optical article comprises a primary mark disposed on the optical article and a secondary mark disposed on the optical article in close proximity to the primary mark. The primary mark comprises a first optical-state change material and the secondary mark comprises a second optical-state change material. The optical article is transformed from a pre-activated state to an activated state when a localized authorized activation method is used that selectively activates the primary mark. The optical article is transformed from a pre-activated state to an deactivated state when a non-localized unauthorized activation method is used that activates the secondary mark along with the primary mark resulting in the second optical-state change material undergoing a reverse color change when compared to the first optical-state change material.

As used herein the phrase "localized authorized activation method" refers to a method wherein the activation signal employed to activate the optical article is focused on a restricted area of the optical article. The restricted area of the optical article may contain the primary mark, which on being activated may render the optical article playable. As used herein the phrase "non-localized unauthorized activation method" refers to a method wherein the activation signal employed to activate the optical article is not focused on a restricted area of the optical article. Instead the activation signal may cover a larger area on the surface of the optical article. The optical article may contain the secondary mark, which on being activated may render the optical article unplayable. In one embodiment, the non-localized activation signal may activate the secondary mark along with the primary mark and render the optical article unplayable. In one embodiment, the non-localized activation signal may activate only the secondary mark and may render the optical article unplayable.

For example, when a legitimate user uses an activation device to activate the optical article using a localized authorized activation method, for example at the POS, the primary mark may be activated and the optical article may be correctly activated and rendered playable by a player. When an illegitimate user uses any other non-localized unauthorized activation method for activating the optical article using any activation device, for example generalized heating in an oven, the secondary mark may be activated along with the primary mark and thus the optical article may be incorrectly activated and rendered unplayable by the player.

As mentioned above, the first optical-state change material used in the primary mark and the second optical-state change material used in the secondary mark however differ in that the secondary mark will undergo a reverse color change in relation to the color change of the primary mark. For example, in one embodiment, if the primary mark changes from opaque to transparent, the secondary mark changes form transparent to opaque. In another embodiment, if the primary mark changes from transparent to opaque, the secondary mark changes from opaque to transparent.

In one embodiment, the mark includes an optical state change material comprising a dye or a reactive material. As used herein the term "optical state change" material is used to describe a material which is capable of existing in at least two different forms, each form possessing a unique optical state, for example a unique wavelength associated with a maximum optical absorbance within a range from about 200 nm to about 800 nm, or a unique extinction coefficient at a specific wavelength between about 200 nm to about 800 nm.

In one embodiment, the optical state change material is selected from one or more of a color-shift dye, a photovoltaic material, a magnetic material, an electrochromic material, a thermochromic material, a magneto-optical material, a photorefractive material, a light scattering material, and a phase change material. Non-limiting examples of optical state change materials include halochromic optical state change materials, photo-bleachable materials, polymeric materials, organic compounds, hydrogels, liquid crystalline materials, leuco dyes, inorganic compounds such as, but not limited to, metal oxides and organometallic compounds, materials capable of undergoing a sigmatropic bond rearrangement, and reactive adduct materials. In various embodiments, the optical state change materials may undergo the optical state change under the influence of thermal stimulus for example, thermochromic or an electrical stimulus for example, electrochromic. The term "thermochromic" as used herein, describes materials that undergo either a reversible or an irreversible thermally induced color change. The term "electrochromic" as used herein, describes materials that undergo either a reversible or an irreversible electrically induced color change. One suitable halochromic optical state change material that may be used in the mark is a chromic dye. As described herein the term "halochromic" describes a material which changes optical state for example, color, upon a change in pH i.e., a change in the acidity or basicity results in a change in the optical absorbance of the chromic dye. This process is also known as "acidichromism" or "halochromism". For example, the mark may contain a dye i.e., a pH responsive dye such as for example a triaryl methylene dye. One example of a triaryl methylene dye is the sodium salt of Bromocresol green, which undergoes a change in its maximum optical absorbance from about 600 nm to about 650 nm at a pH value greater than about 7 to an optical absorbance below 450 nm at a pH values less than about 5. Within the scope of this disclosure the terms "pH" or "change in pH" are used to describe the acidity, basicity, or change in acidity or basicity of the mark. A decrease in the pH is a result of an increase in acidity (or decrease in basicity) and an increase in the pH is a result of a decrease in acidity (or increase in basicity). In aqueous systems, pH values less than 7 are classified as acidic and pH values greater than 7 are classified as basic.

In one embodiment, the primary mark or the secondary mark is disposed using a thermochromic ink composition comprising a halochromic optical-state change material, at least one additive, at least one solvent, and at least one binder material. The pH of the ink composition is such that the halochromic optical-state change material remains in its acidic state until it is acted upon by a thermal stimulus; and the ink composition is capable of transforming from a first optical state to a second optical state upon a change in pH caused by exposure to a thermal stimulus. In one embodiment, the additive is the conjugate base of a volatile acid. In one embodiment, the change in pH of the coating is due to extraction of a proton from the halochromic optical state change material and subsequent evaporation, sublimation, or degradation of the proton-conjugate base pair. In one embodiment, the evaporation, sublimation, or degradation of the proton-conjugate base pair in the coating is irreversible.

In one embodiment, the primary mark or the secondary mark is disposed using a thermochromic ink composition comprising a halochromic optical-state change material, at least one base, at least one solvent, and at least one binder material. The pH of the ink composition is such that the halochromic optical-state change material remains in its basic state until it is acted upon by a thermal stimulus; and wherein the ink composition is capable of transforming from a first optical state to a second optical state upon a change in pH caused by exposure to a thermal stimulus. In one embodiment, the change in pH of the coating is due to a change in concentration of the base within the coating. In one embodiment, the change in pH of the coating is due to a change in concentration of the base within the coating due to evaporation, sublimation, or degradation of the base. In one embodiment, the change in concentration of the base within the coating is irreversible.

Non-limiting examples of dyes that can be used include bromocresol green, bromocresol purple, bromothymol blue, bromophenol blue, thymolphthalein, thymol blue, aniline blue WS, durazol blue 4R, durazol blue 8G, magenta II, mauveine, naphthalene blue black, orcein, pontamine sky blue 5B, naphthol green B, picric acid, martius yellow, naphthol yellow S, alcian yellow, fast yellow, metanil yellow, azo-eosin, xylidine ponceau, orange G, ponceau 6R, chromotrope 2R, azophloxine, lissamine fast yellow, tartrazine, amido black 10B, bismarck brown Y, congo red, congo corinth, trypan blue, Evans blue, Sudan III, Sudan IV, oil red O, Sudan black B, Biebrich scarlet, Ponceau S, woodstain scarlet, Sirius red 4B, Sirius red F3B, fast red B, fast blue B, patent blue V, auramine O, malachite green, fast green FCF, light green SF yellowish, pararosanilin, rosanilin, new fuchsin, Hoffman's violet, methyl violet 2B, crystal violet, Victoria blue 4R, methyl green, ethyl green, ethyl violet, acid fuchsin, water blue I, methyl blue, chrome violet CG, chromoxane cyanin R, Victoria blue R, Victoria blue B, night blue, pyronin Y, pyronin B, rhodamine B, fluorescein, eosin Y ws, ethyl eosin, eosin B, phloxine B, erythrosin B, rose bengal, Gallein, acriflavine, acridine orange, primuline, thioflavine T, thioflavine S, safranin O, neutral red, azocarmine G, azocarmine B, safranin O, gallocyanin, gallamine blue, celestine blue B, nile blue A, thionin, azure C, azure A, azure B, methylene blue, methylene green, toluidine blue O, alizarin, alizarin red S, purpurin, anthracene blue SWR, alizarin cyanin BBS, nuclear fast red, alizarin blue, Luxol fast blue MBS, alcian blue 8GX, saffron, Brazilin and Brazilein, hematoxylin and hematein, laccaic acid, Kermes, and carmine. Non-limiting examples of photo-bleachable materials may include dye compounds selected from xanthenes, thiazines, oxazines, triarylmethines, lactones, cyanines, fulgides, spiropyrans, and diarylethenes. Examples of dye compounds can include, but are not limited to, methylene blue, toluidine blue, Rose Bengal, erythrosine B, eosin Y, and fluorone dyes.

In various embodiments, the marks may be deposited in a discrete area on the optical article, such that at least one mark, at least one line, at least one radial arc, at least one patch, a continuous layer, or a patterned layer extends across at least a portion of the optical article. The marks may be deposited on the optical article in various forms, such as a discrete portion, a continuous film, or a patterned film. During authorization, the primary mark may be stimulated in a continuous, discontinuous or pulsed form. In one embodiment, the marks are disposed in a discrete area of the optical article in the geometry of an arc with a length and a width; wherein the length is longer than the width.

Alternatively, instead of being deposited on the surface of the optical article, the primary and the secondary mark may be deposited inside the structure of the optical article. In optical storage articles, the marks may be deposited in the substrate on which the optical data layer is deposited. In alternate embodiments, the marks may be deposited between the layers of the optical article, or may be deposited within a layer of the optical article. For example, the ink composition may be incorporated in the UV curable adhesive of the bonding (spacer) layer. In this case it should be appreciated that these marks should be thermally stable to withstand the manufacturing temperatures of the optical article. Also, these marks may preferably absorb the wavelength of the laser light in one of the activated, or the pre-activated state of the optical article. Upon interaction with an authorized activation signal, the primary mark present inside the substrate changes color. As a result, the substrate may become transparent to the laser light, thereby facilitating the transmittance of laser light through the substrate and making the optical article readable.

In one embodiment, the marks may be printed on the surface of the optical article using a method selected from one or more of a screen-printing method, a ink-jet printing method, a directwrite method, a pad printing method, a microarray deposition method, a capillary dispensing method, a gravure printing method, thermal transfer printing method, and adhesion of pre-made polymer films.

In one embodiment, the marks absorb light at a wavelength in a range of from about 450 nanometers to about 700 nanometers in the second optical state. In another embodiment, the marks absorb light at a wavelength of about 650 nanometers in the second optical state. In yet another embodiment, the marks absorb light at a wavelength of about 405 nanometers in the second optical state. In one embodiment, the marks absorb light at a wavelength in a range of from about 450 nanometers to about 700 nanometers in the first optical state. In another embodiment, the marks absorb light at a wavelength of about 650 nanometers in the first optical state. In yet another embodiment, the marks absorb light at a wavelength of about 405 nanometers in the first optical state. The combination of the primary mark and the secondary mark may be so chosen that at any given point of time if both the marks are activated, the secondary mark will undergo a reverse color change when compared to the primary mark thereby rendering the optical article unplayable or unreadable by the optical article reader.

As used herein, the term "optical article" refers to an article that includes an optical data layer for storing data. The stored data may be read by, for example, an incident laser of an optical data reader device such as a standard compact disc (CD) or digital versatile disc (DVD) drive, commonly found in most computers and home entertainment systems. In some embodiments, the optical article may include one or more data layers. Furthermore, the optical data layer may be protected by employing an outer coating, which is transparent to the incident laser light, and therefore allows the incident laser light to pass through the outer coating and reach the optical data layer. Non-limiting examples of optical articles include a compact disc (CD); a digital versatile disc (DVD); multi-layered structures, such as DVD-5 or DVD-9; multi-sided structures, such as DVD-10 or DVD-18; a high definition digital versatile disc (HD-DVD); a Blu-ray disc; a near field optical storage disc; a holographic storage medium; and a volumetric optical storage medium, such as, a multi-photon absorption storage format. In other embodiments, the optical article may also include an identification card, a passport, a payment card, a driver's license, a personal information card, or any other documents or devices, which employ an optical data layer for data storage. In one embodiment, the first surface of the optical article comprises a polycarbonate.

In one embodiment, the portion of the optical article covered by the mark undergoes at least one change selected from the group consisting of layer reflectivity, single layer reflectivity, dual layer reflectivity, refractive index, birefringence, polarization, opacity, absorbance, thickness, optical pathlength, and position, when activated using the activation method.

In one embodiment, the pre-activated state or the unplayable state is characterized by an optical reflectivity of at least one portion of the optical article having a reflectivity of less than about 20 percent based on the reflectivity of the at least one portion of the optical article in the final state i.e., the activated state or the playable state. It should be appreciated that there are analogous predetermined values of optical properties for activating different optical articles. For example, the specified (as per ECMA-267) minimum optical reflectivity for DVD-9 (dual layer) media is in a range from about 18 percent to about 30 percent and is dependent upon the layer (0 or 1).

As discussed above one embodiment of the present disclosure is directed towards a set of a primary mark and a secondary mark disposed on an optical article, for example, a DVD for reasons of security against theft. The marks have specific optical states when disposed. In one example, the marks may have a high optical absorbance for the DVD-players laser beam at 650 nanometers, blocking the reading of the underlying data layers when the DVD disc is in a pre-activated state. The DVD may become playable only after it has undergone "activation" at point of sale (POS) that reduces the absorbance of the marks at 650 nanometers by a chemical reaction of the dyes or materials in that layer. For example, in the pre-activated state, both the primary mark and the secondary mark may be transparent to laser, both may be opaque to the laser, or one may be opaque to the laser and one may be transparent to the laser. On being subjected to the localized authorized activation the primary mark undergoes a color change and the secondary mark remains unchanged. However, on being subjected to a non-localized unauthorized activation the secondary mark may undergo a color change along with the primary mark, in a manner such that the secondary mark undergoes a reverse color change when compared to the primary mark and renders the optical article unreadable by a optical article reader. In one embodiment, the state of the marks may be used in conjunction with control logic that are placed in the data layer during the DVD authoring process as described below. In various embodiment, the reactive material may undergo a color change by following at least one of the two routes (i) in the pre-activated state the electrochromic material may absorb a light having a wavelength of about 650 nm light and once activated (i.e., when a voltage is applied to the electrochromic mark) the material may be transparent to light having a wavelength of about 650 nanometers, and (ii) in the pre-activated state the electrochromic material may be transparent to light having a wavelength of about 650 nanometers and once activated, the material may absorb light having a wavelength of about 650 nm. In one example of a "tailored menu", where the primary and secondary marks are configured to be in a pre-determined optical state in the activated state of the article, the primary mark may be opaque to the DVD player laser in the pre-activated state, thus not allowing the player to read the control logic underneath the primary mark. After localized authorized activation at POS, the primary mark may be transformed to a transparent mark, i.e., a mark readable by the DVD player's laser and the underlying control logic may be accessible to the laser of the player. The player may be instructed (based on the authored control logic) to allow the entire DVD to be rendered playable. Also in the pre-activated state the secondary mark may be transparent to the DVD player's laser. In an event, an attempt is made to activate the DVD using a non-localized unauthorized activation the secondary mark may turn opaque to the DVD player's laser. In one embodiment, the underlying control logic under the primary mark may instruct the player to move on to the secondary mark. The secondary mark may include an underlying logic instructing the player to move on and play the movie. However, when the disc is converted to an unauthorized activated disc after the activation using the non-localized activation signal the secondary mark may turn opaque. The player, being able to read the control logic underlying the primary mark moves on to the secondary mark, may however not be able to read the control logic underlying the secondary mark that instructs the player to play the DVD, the secondary mark being opaque, the DVD player is not able to read the disc.

Figure 1:
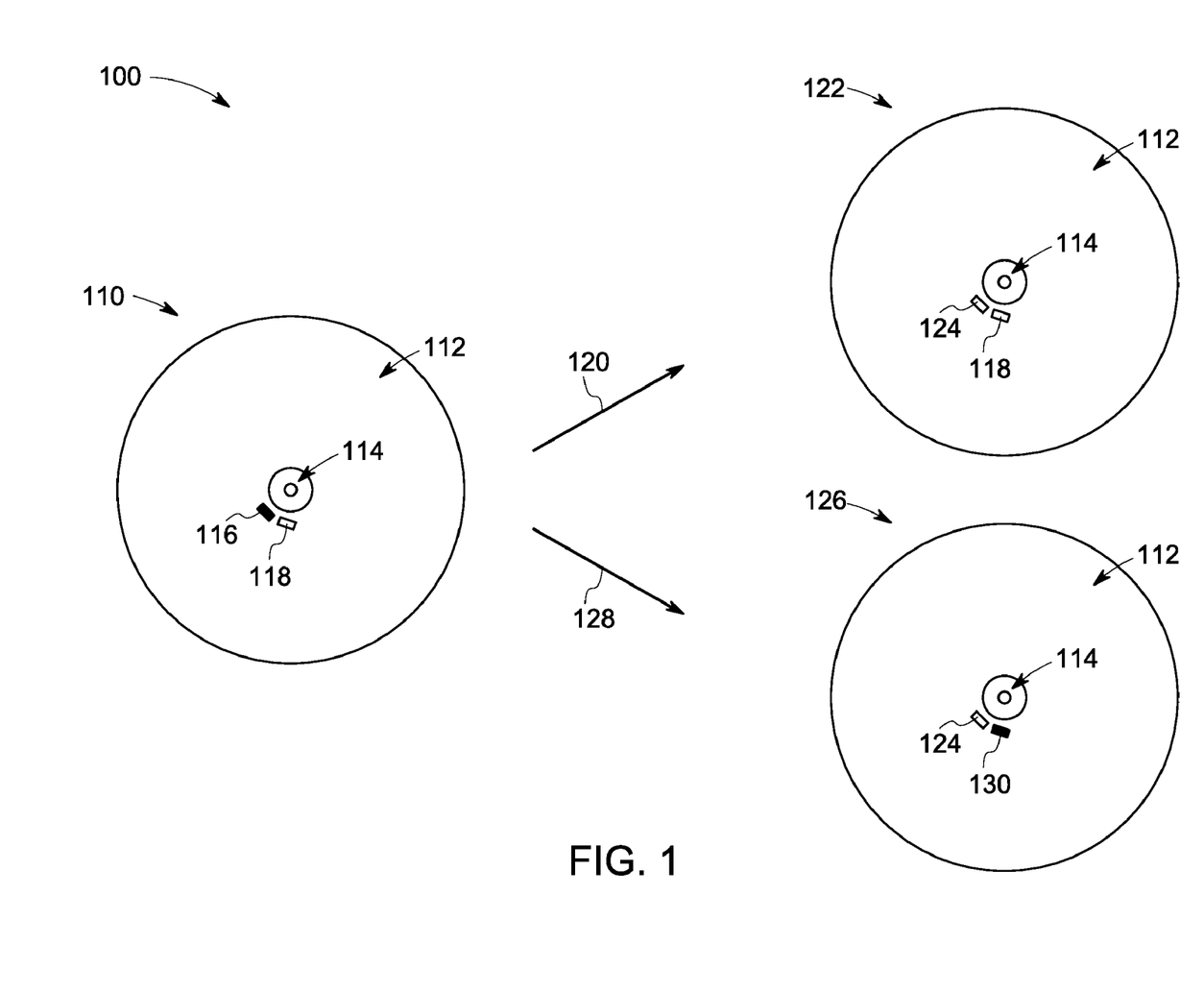
FIG. 1 shows an optical article in accordance with an embodiment described herein.

Referring to FIG. 1, a section of an optical article 100, for example a DVD, is shown in a pre-activated state 110, an authorized activated state 122, and an unauthorized activated state 126. The optical article includes a data storage region 112 and an inner hub 114. The data storage region 112 includes an optical data layer (not shown in figure), which stores the data, whereas the inner hub 114 is the non-data storage region of the optical article 100. An optically detectable primary mark 116 and an optically detectable secondary mark 118 are disposed on the surface of the optical article 100 in a region over the data storage region 112. In the pre-activated state the primary mark is opaque and the secondary mark is transparent to the DVD player's reader. In one embodiment, the DVD is subjected to a localized heating 120, say for example, at the POS, when the DVD gets transformed into an authorized activated disc 122. In the authorized activated disc the primary mark changes from opaque to transparent 124 and the secondary mark remains transparent to the DVD player's reader. In another embodiment, the DVD is subjected to general heating 128, say for example, the DVD is placed in an oven, when the DVD gets transformed into an unauthorized activated disc 126. In the authorized activated disc the primary mark changes from opaque to transparent and the secondary mark changes from transparent to opaque 130 to the DVD player's reader and the disc may be rendered unplayable since the opaque secondary mark interferes with the read out of the player.

As noted above, this change in the optical state may be caused by chemical changes within the optical-state change material, which are caused by exposure to the activation signal. The marks 116, 118 may cover at least a portion of the region over the data storage region 112 of the optical article 100. In the pre-activated state 110, the optical article 100 may not be readable at least in the portions where the mark 116 is disposed. In other words, the optical article in the pre-activated state 110 has a reflectivity of less than about 20 percent, in the portions where the mark 116 is disposed.

Another embodiment of the present disclosure is directed to an optical article. The optical article comprises a mark disposed on the optical article. The mark comprises an optical-state change material that undergoes multiple color changes. The optical article is transformed from a pre-activated state to a first determined activated state when the mark is exposed to an authorized activation signal. The optical article is transformed from a pre-activated state to a second determined deactivated state when the mark is exposed to an unauthorized activation signal.

In one embodiment, the authorized activation signal is a controlled activation signal. As used herein the phrase "controlled activation signal" refers to an activation signal with a pre-determined signal profile. For example, in case of a mark containing a thermochromic optical-state change material, the controlled activation signal could include a POS equipment with a pre-determined heating profile. When the optical article is subjected to the pre-determined heating profile at the POS, the optical article changes form the pre-activated state to a first determined activated state and is rendered playable by the optical article reader. As used herein the phrase "uncontrolled activation signal" refers to an activation signal which may end up activating the disc beyond the pre-determined level of activation. For example, in case of a mark containing a thermochromic optical-state change material, the uncontrolled activation signal could include an oven equipment where an attempt is made to activate disc. Since the disc is not activated using a pre-determined heating profile the optical article may change form the pre-activated state to a second determined deactivated state and the disc may be rendered unplayable by the optical article reader.

Figure 2:
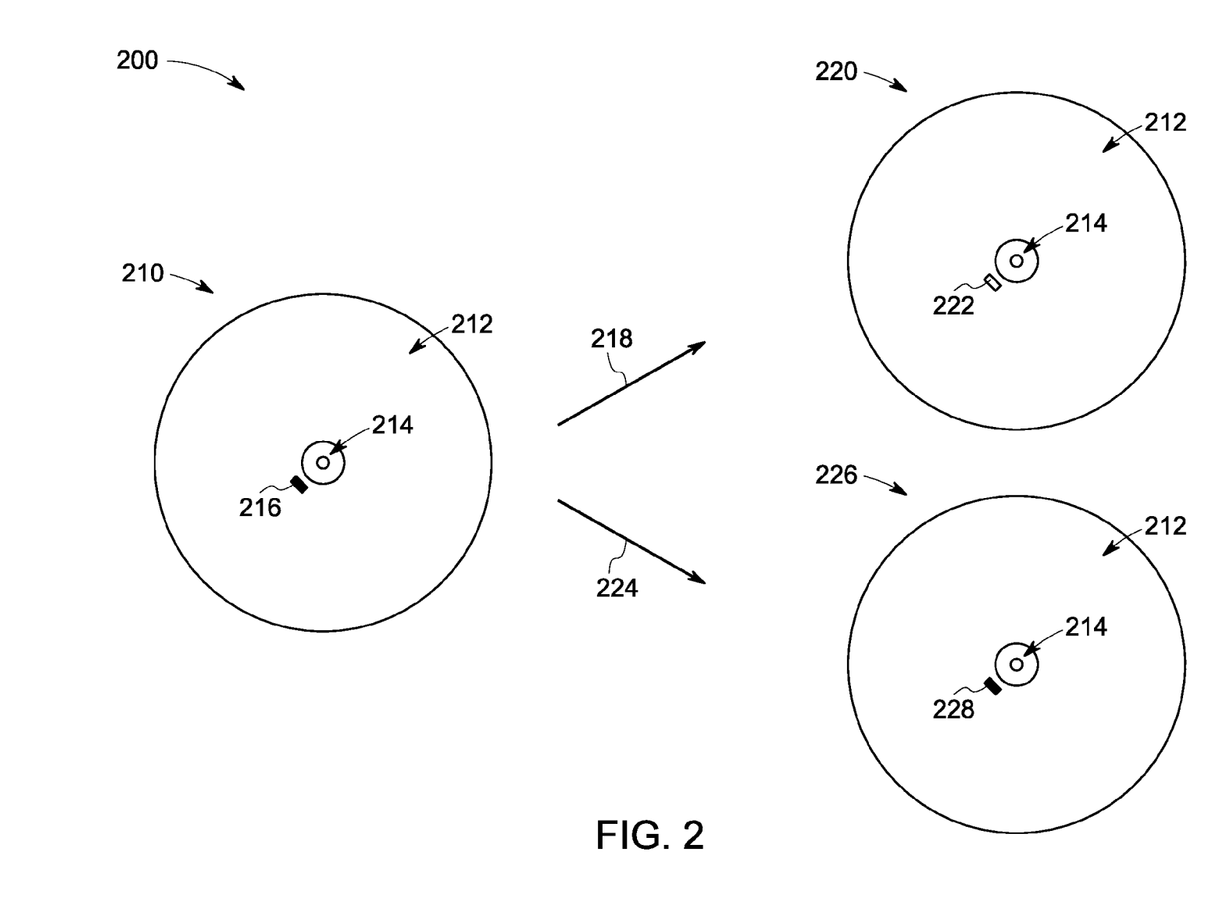
FIG. 2 shows an optical article in accordance with an embodiment described herein.

Referring to FIG. 2, a section of an optical article 200, for example a DVD, is shown in a pre-activated state 210, an authorized activated state 220, and an unauthorized activated state 226. The optical article includes a data storage region 212 and an inner hub 214. The data storage region 212 includes an optical data layer (not shown in figure), which stores the data, whereas the inner hub 214 is the non-data storage region of the optical article 100. An optically detectable mark 216 is disposed on the surface of the optical article 100 in a region over the data storage region 112. The mark comprises an optical-state change material that undergoes multiple color changes on heating. In the pre-activated state the mark is opaque. In one embodiment, the DVD is subjected to a controlled heating 218, say for example, at the POS, when the DVD gets transformed into an authorized activated disc 220. In the authorized activated disc the mark change from the pre-activated state i.e., opaque to the first determined activated state 222 i.e., transparent. In another embodiment, the DVD is subjected to general heating 224, say for example, the DVD is placed in an oven, when the DVD gets transformed into an unauthorized activated disc 226. In the unauthorized activated disc the mark changes from the pre-activated state i.e., opaque to the first determined activated state, and further since the heating is uncontrolled the mark changes to a second pre-determined deactivated state i.e., opaque 228 to the DVD player's laser and the disc may not be rendered playable since the opaque secondary mark interferes with the read out of the player.

In one embodiment, the optical-state change material employed in this embodiment comprises a dye material that may undergo multiple color changes. In one embodiment, the dye material includes squarylium dye (4,4'-[(1s)-2,4-dihydroxycyclobutane-1,3-diyl]dinaphthalene-1,3-diol) having a formula I.

Yet another embodiment of the present disclosure is directed to an optical article. The optical article comprises a mark disposed on the optical article. The mark comprises an optical-state change material dispersed in a cross linked matrix.

In one embodiment, the cross linked matrix may be formed using any material containing polymerizable functionalities including but not limited to acrylates, methacrylates, epoxides, urethanes, ethylenes, maleates, fumarates, styrenes, nitrites, unsaturated polyesters, silicones, silanes, and silazanes. The cross linked matrix provides a stronger bonding between the mark and the surface of the optical article on which the mark is disposed. The cross linked matrix may greatly minimize any unintentional wiping or scratching off of the mark. If the mark is activated at the POS, the optical article for example a DVD, may be rendered playable by authorized activation. In one embodiment, the optical-state change materials employed in the cross linked matrix may include the dye materials discussed hereinabove.

An unauthorized or unintentional attempt to remove the mark from the optical article may result in transforming the optical article from a pre-activated state to a deactivated state. For example, if the DVD is stolen, the unauthorized attempt to remove the mark may include one or more techniques selected from wiping, scratching off the mark from the surface of the optical article, dissolving, impregnating with a pH-changing material, and extraction of dye material with a solvent. For example, an unauthorized user may employ commonly available household solvents like isopropyl alcohol or vinegar (acetic acid) for wiping off the marks from the surface of the disc. In certain embodiments, certain industrial solvents may also be available to the unauthorized user, say for example, methanol. If the mark may be wiped off, then the DVD may be rendered playable by the unauthorized user. In some embodiments, the mark may be physically removed from the surface of disc by scratching it off by using a sharp object. The mark may be wiped off accidentally if the DVD were to come in contact with a solvent or a sharp object unintentionally.

In various embodiments, the mark may include the optical-state change materials described hereinabove. In one embodiment, a curable coating may be disposed over the mark. The curable coating may assist in enhancing the protection of the mark from wiping, scratching off the mark from the surface of the optical article, dissolving, impregnating with a pH-changing material, or extraction of dye material with a solvent. The curable coating may be selected from one or more of a polymer, an oligomer, a polymeric precursor, and a polymerizable monomer. Suitable non-limiting examples of the curable coatings include poly(alkenes), poly(anilines), poly(thiophenes), poly(pyrroles), poly(acetylenes), poly(dienes), poly(acrylates), poly(methacrylates), poly(vinyl ethers), poly(vinyl thioethers), poly(vinyl alcohols), poly(vinyl ketones), poly(vinyl halides), poly(vinyl nitriles), poly(vinyl esters), poly(styrenes), poly(arylenes), poly(oxides), poly(carbonates), poly(esters), poly(anhydrides), poly(urethanes), poly(sulfonates), poly(siloxanes), poly(sulfides), poly(thioesters), poly(sulfones), poly(sulfonamides), poly(amides), poly(ureas), poly(phosphazenes), poly(silanes), poly(silazanes), poly(benzoxazoles), poly(oxadiazoles), poly(benzothiazinophenothiazines), poly(benzothiazoles), poly(pyrazinoquinoxalines), poly(pyromellitimides), poly(quinoxalines), poly(benzimidazoles), poly(oxindoles), poly(oxoisoindolines), poly(dioxoisoindolines), poly(triazines), poly(pyridazines), poly(piperazines), poly(pyridines), poly(piperidines), poly(triazoles), poly(pyrazoles), poly(pyrrolidines), poly(carboranes), poly(oxabicyclononanes), poly(dibenzofurans), poly(phthalides), poly(acetals), poly(anhydrides), carbohydrates, blends of the above polymeric materials, and copolymers thereof. In one embodiment, the thermochromic ink composition comprises a polymerizable monomer, such as an acrylate monomer (e.g., methyl methacrylate), which can be polymerized (i.e. cured) to form a thermochromic coating after the thermochromic ink composition has been deposited on an optical article.

Still yet another embodiment of the present disclosure is directed to an optical article. The optical article comprises a mark disposed on the optical article. The mark comprises a curable optical-state change material.

In one embodiment, the curable optical-state change material comprises a dye functionalized with monomer groups that afford polymer bound dyes on curing. In one embodiment, the curable optical-state change material forms a part of a crosslinked matrix as discussed above. The crosslinking is achieved through chemical bonding. An example exemplifying this embodiment would by a dye of the class phthalein or sulfophathalein in which the phenolic portion of the molecule contains an unoccupied position ortho to the phenolic hydroxyl group. The dye is then functionalized at this position to contain a polymerizable group such as a vinyl or acrylate group. A dye functionalized in this manner will be capable of forming a polymer film when exposed to an energy source such as thermal or ultraviolet. Alternatively, the dye can be dispersed with other curable monomers such that when cured the dye becomes part of a larger polymer network. Since the dye may still retain the phenolic hydroxyl groups it is still sensitive to pH. A mark made from an ink composition containing the curable dye is exposed to ultraviolet light forming an indelible mark that cannot be removed by common solvents but at the same time retains its pH sensitivity. An unauthorized or unintentional attempt to remove the mark from the optical article may result in transforming the optical article from a pre-activated state to a deactivated state.

Still yet another embodiment of the present disclosure is directed to an optical article. The optical article comprises a mark disposed on the optical article. The mark comprises an optical-state change material. The mark is covered with a protective layer.

In one embodiment, the protective layer comprises one or more of a polymer layer or a curable layer. In one embodiment, the curable layer comprises one or more of a polymer, an oligomer, a polymeric precursor, and a polymerizable monomer. In one embodiment, the materials described herein above for the curable coating may be employed for forming the polymer layer or the curable layer.

In one embodiment, the protective layer encapsulates the mark. In another embodiment, the protective covers only the exposed surface of the mark. In still another embodiment, the protective layer covers a portion of the mark. In one embodiment, the protective layer coats the entire optical article. In one embodiment, the polymer layer is overprinted on the mark and the dimension of the protective layer is about the same as the dimension of the mark. In one embodiment, two protective layers may be used, wherein a first protective layer encapsulates the mark and is about the same dimension as the mark; and a second protective layer coats the entire optical article.

In various embodiments, the marks may include the optical-state change materials described in various embodiments hereinabove. An unauthorized or unintentional attempt to remove the mark from the optical article results in transforming the optical article from a pre-activated state to a deactivated state. In certain embodiments, covering the mark protects it from unauthorized activation by acids, as demonstrated by the vinegar swab tests in the Examples below.

Figure 3:
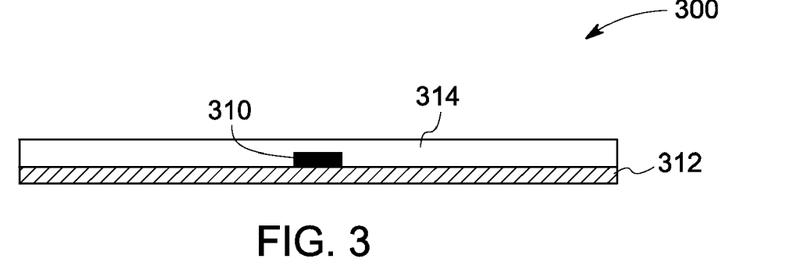
FIG. 3 shows an optical article in accordance with an embodiment described herein.

Referring to FIG. 3, a side-view of a cross section of an optical article 300, for example a DVD, is shown. A mark 310 is disposed on the surface of the DVD 312. A curable coating 314 is disposed over the mark in a manner such that the coating covers the entire surface of the DVD including the mark.

Figure 4:
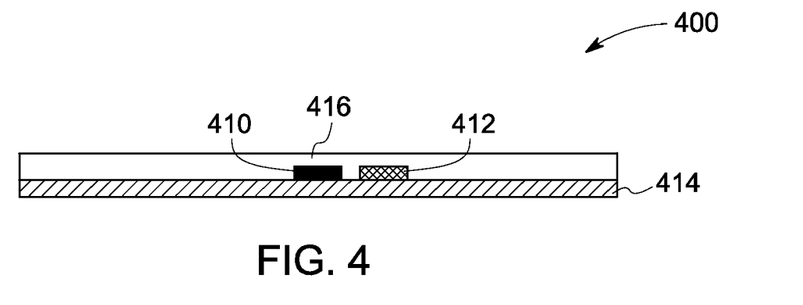
FIG. 4 shows an optical article in accordance with an embodiment described herein.

Referring to FIG. 4, a side-view of a cross section of an optical article 400, for example a DVD, is shown. As discussed above in FIG. 1, the FIG. 4 indicates a primary mark 410 and a secondary mark 412, both disposed on the surface of the DVD 414. A curable coating 416 is disposed over the marks in a manner such that the coating covers the entire surface of the DVD including the primary and the secondary marks. The use of the curable coating over the DVD minimizes the chances of unintentional removal of the marks and makes it more difficult for an unauthorized person to wipe or scratch of the marks from the surface of the DVD.

Figure 5:
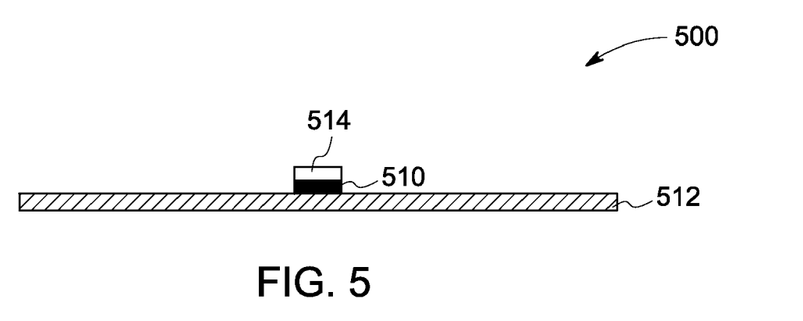
FIG. 5 shows an optical article in accordance with an embodiment described herein.
Figure 6:
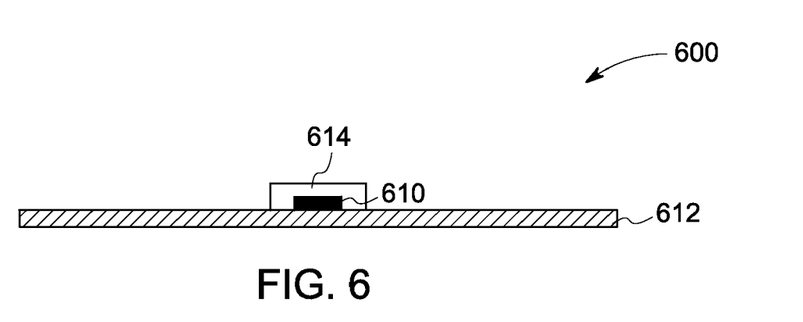
FIG. 6 shows an optical article in accordance with an embodiment described herein.

Referring to FIG. 5, a side-view of a cross section 500 of an optical article, for example a DVD, is shown. In the cross section 500 a polymer coating 514 is shown to be overprinted over a mark 510 disposed on the surface of the optical article 512. The dimensions of the polymer coating is such that the polymer coating covers the only the exposed top surface of the mark. Referring to FIG. 6, a side-view of a cross section 600 of an optical article, for example a DVD, is shown. In the cross section 600 a polymer coating 614 is shown to be overprinted over a mark 610 disposed on the surface of the optical article 612. The dimensions of the polymer coating is such that the polymer coating covers the exposed top surface and the sides of the mark, thus encapsulating the exposed surfaces of the mark. The use of the polymer layer over the mark disposed on the DVD surface minimizes the chances of unintentional removal of the marks and makes it more difficult for an unauthorized person to wipe or scratch of the marks from the surface of the DVD.

EXAMPLES

Example 1

Provides a Thermochromic Ink Composition and a Method for Preparing the Same

A 20 milliliters vial was charged with 150 milligrams (mg) Bromocresol green, 1.801 grams (g) of an 8.88 weight by weight percent solution of polymethylmethacrylate (PMMA) in Dowanol PM (propylene glycol methyl ether, CAS 107-98-2, Aldrich), 0.267 g of an 15 weight by weight percent solution of dioctyl phthalate (DOP, CAS 117-81-7, Fluka) in Dowanol PM (propylene glycol methyl ether, CAS 107-98-2, Aldrich) and 1.973 g diacetone alcohol (DAA, 4-hydroxy-4-methyl-2-pentanone, CAS 123-42-2, Aldrich), 108 mg of benzyltrimethylammonium chloride, and 24 mg of propylphosphonic acid. The resultant mixture was stirred for about 30 minutes at about 25 degrees Celsius to produce a yellow solution.

Example 2

Provides a Thermochromic Ink Composition and a Method for Preparing the Same

A 20 milliliters vial was charged with 150 mg Bromocresol green, 1.801 g of an 8.88 weight by weight percent solution of PMMA in Dowanol PM, 0.267 g of an 15 weight by weight percent solution of DOP in Dowanol PM, 1.973 grams (g) DAA, 90 mg of potassium trifluoroacetate, 318 mg of tetrabutylammonium iodide, and 27 mg of propylphosphonic acid. The resultant mixture was stirred for about 30 minutes at about 25 degrees Celsius to produce a yellow solution.

Thermochromic coating compositions were prepared by spin coating a 250 micro liter sample of the ink compositions prepared in Example 1 and Example 2 onto a DVD disc at 2000 RPM for about 30 seconds to produce a yellow coating having a thickness of about 0.5 microns. The coating was allowed to dry at room temperature (about 22 degrees Celsius) for about 12 hours. The coating was then heated in an oven to varying temperatures and the reflectivity studied at room temperature of about 22 degrees Celsius and at elevated temperatures of about 50, 65 and of 100 degrees Celsius. The percent reflectivity of the thermochromic coating, at 650 nanometers, was measured using a fiber optic Ultraviolet-visible spectrometer (Ocean Optics Inc.) in reflectance mode. The recorded absorbance values before and after heating are listed in Table 1.

TABLE 1

| | Percent reflectivity | | |
|---|---|---|---|
| Example | Before Heating | Heating Time | After Heating @ Degrees Celsius |
| 1 | 95 | 15 minutes | 68 @ 100 |
| 2 | 97 | 30 hours | 69 @ 50 |
| 2 | 98 | 3 hours | 17 @ 100 |

It was observed that the spin coated films of the inks were stable at room temperature, i.e., the percent reflectivity at 650 nanometers decreased from 92 percent to 87 percent over a period of 3 weeks at 22 degrees Celsius. However, upon heating, the markings darkened rapidly from yellow to dark green, i.e., the percent reflectivity at 650 nanometers decreased from approximately 100 percent to about 15 percent over a period of 3 hours at 100 degrees Celsius.

The inks were also printed directly on to DVDs with an ink-jet printer in the form of spots. These spots darkened rapidly at high temperature. The percent reflectivity of the spots, at 650 nm, was measured using a fiber optic Ultraviolet-visible spectrometer (Ocean Optics Inc.) in reflectance mode. The recorded absorbance values before and after heating are listed in Table 2.

TABLE 2

| | Percent reflectivity | | |
|---|---|---|---|
| Example | Before Heating | Heating time | After Heating @ degrees Celsius |
| 1 | 82 | 2 hours | 40 @ 65 |
| | 82 | 44 minutes | |

Figure 7:
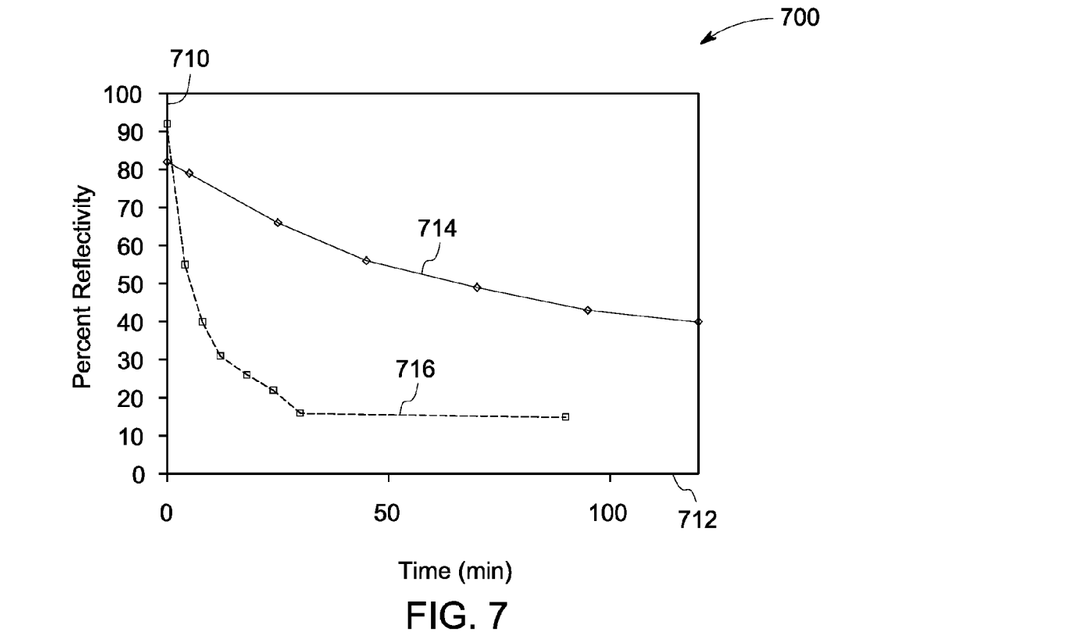
FIG. 7 shows a change in the percent reflectivity of an optical article in accordance with an embodiment described herein.

Referring to FIG. 7, a graph 700 shows the change in percent reflectivity (Y-Axis) 710 over time (X-Axis) 712, for the thermochromic ink composition prepared in Example 1. The percent reflectivity was measured for printed security spots on a DVD at elevated temperatures. The DVD was heated at 65 degrees Celsius for about 100 minutes 714 and at 100 degrees Celsius for about 100 minutes 716. The inks prepared in Example 1 and 2 may be employed in forming a secondary mark in combination with a primary mark, such that the secondary mark undergoes reverse color change when compared to the primary mark, if the disc is activated using a non-localized unauthorized activation.

Example 3

Provides a Thermochromic Ink Composition and a Method for Preparing the Same

A $2 \times 10^{-5}$ M solution of squarylium dye 1, 4,4'-[(1s)-2,4-dihydroxycyclobutane-1,3-diyl]dinaphthalene-1,3-diol was prepared in Dowanol PM. The pH of the solution was adjusted by optionally adding an acid, for example, trifluoroacetic acid (TFA) or a base, for example, dicyclohexylamine (DCHA, CAS 101-83-6, Aldrich) or 1,8-diazabicyclo[5.4.0]undec-7-ene (DBU, CAS 6674-22-2, Aldrich). The pH of the solutions were measured using a Oakton hand-held pH meter (RS 232 meter, model 35614-80). A Ultraviolet-visible spectrum was measured using a Ocean Optics USB2000 fiber optic spectrometer. The data of the four solutions prepared at different pH are summarized in Table 3. Table 3 indicates the maximum wavelength of absorption, the absorbance at the maximum wavelength Emax, and the absorbance at 650 nanometers E650.

TABLE 3

| Dye Solution | Acid/Base added | pH | Maximum wavelength absorption | E max | E650 |
|---|---|---|---|---|---|
| 1 | TFA | 1.53 | 667 | 76250 | 47750 |
| 2 | none | 7.0 | 542 | 30700 | −50 |
| 3 | DCHA | 10.83 | 544 | 28700 | 2900 |
| 4 | DBU | 13.09 | 669 | 87850 | 60600 |

Figure 8:
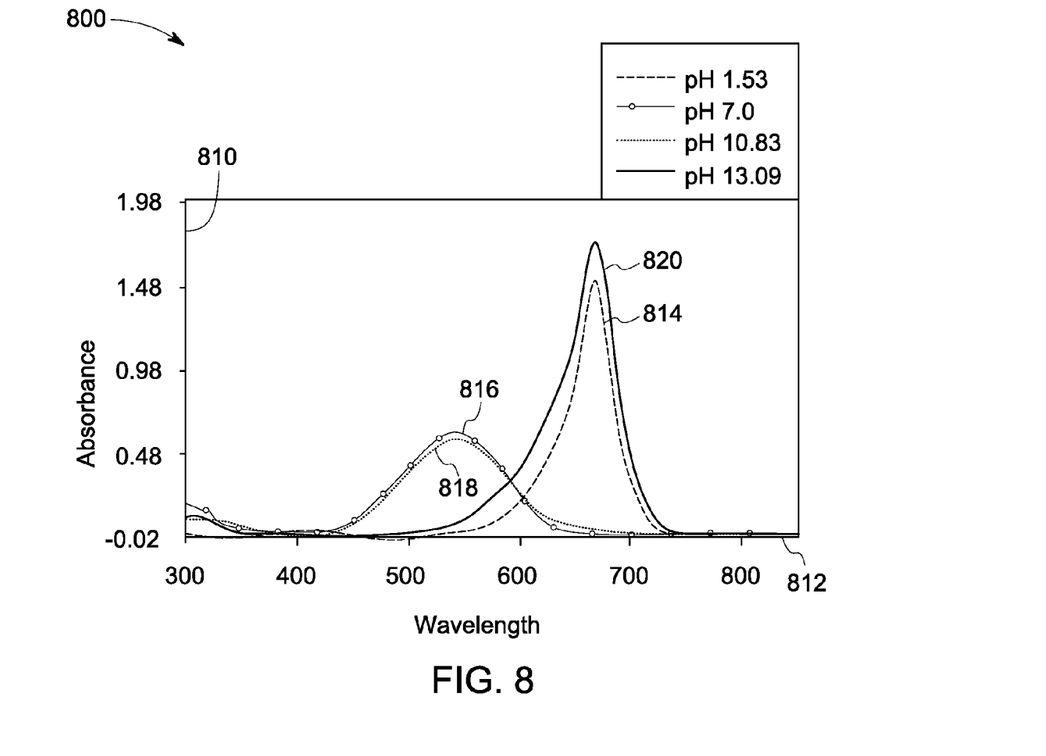
FIG. 8 shows an ultraviolet-visible spectra in accordance with an embodiment described herein.

Referring to FIG. 8, a graph 800 including the Ultraviolet-visible spectra of the four solutions prepared in Example 3 is illustrated. The absorbance is indicated on the Y-axis 810 and the wavelength is indicated on the X-axis 812. As indicated in Table 3 the Ultraviolet-visible spectra of a $2 \times 10^{-5}$ M solution of squarylium dye 1 in Dowanol PM was recorded at pH values of 1.53 (814), 7.0 (816), 10.83 (818), and 13.09 (820). The data provided in Table 3 shows that the squarylium dye 1 exhibits significant absorbtion at 650 nanometers at both low and high pH and is nearly transparent in the range of pH 7 to 10.83. The graph confirms that the absorption at high and low pH is nearly identical across the entire visible spectrum.

Examples 4 to 7

Provide Thermochromic Ink Compositions and a Method for Preparing the Same

The following components were employed in preparing the ink compositions of Examples 4 to Example 7. These formulations contain a polymer binder, PMMA (molecular weight=15000, CAS 9011-14-7, Aldrich), squarylium dye 1, a base selected from either DCHA or DBU, the thermally latent acid dimethyl-4-methoxybenzylphenyl ammonium hexafluoroantimonate, (i.e., CXC1612, obtained from King Industries, Inc. (Norwalk, Conn.), an optional plasticizer, DOP and solvents Dowanol PM and DAA. The amount of the components used is listed in Table 4 below.

TABLE 4

| | Example 4 | | | Example 5 | | | Example 6 | | | Example 7 | | |
|---|---|---|---|---|---|---|---|---|---|---|---|---|
| Chemical | Amount in Grams | Weight percent in ink | Weight percent in film | Amount in Grams | Weight percent in ink | Weight percent in film | Amount in Grams | Weight percent in ink | Weight percent in film | Amount in Grams | Weight percent in ink | Weight percent in film |
| PMMA | 0.133 | 5.5 | 5.5 | 0.107 | 4.4 | 4.4 | 0.133 | 5.5 | 5.5 | 0.107 | 4.4 | 4.4 |
| Squarylium | 0.0483 | 2.0 | 2.0 | 0.048 | 2.0 | 2.0 | 0.0483 | 2.0 | 2.0 | 0.048 | 2.0 | 2.0 |
| DCHA | 0.029 | 1.2 | 1.2 | 0.029 | 1.2 | 1.2 | 0.0 | 0.0 | 0.0 | 0.0 | 0.0 | 0.0 |
| DBU | 0 | 0.0 | 0.0 | 0 | 0.0 | 0.0 | 0.024 | 1.0 | 1.0 | 0.024 | 1.0 | 1.0 |
| CXC-1612 | 0.0855 | 3.5 | 3.5 | 0.1423 | 5.9 | 5.9 | 0.0855 | 3.5 | 3.5 | 0.1425 | 5.9 | 5.9 |
| DOP | 0 | 0.0 | 0.0 | 0.027 | 1.1 | 1.1 | 0 | 0.0 | 0.0 | 0.027 | 1.1 | 0.011 |
| PM/DAA (50:50) | 2.13 | 87.8 | 0.878 | 2.06 | 85.3 | 85.3 | 88.0 | 88.0 | 88.0 | 2.08 | 86.6 | 0.856 |
| Total | 2.4258 | 100.0 | | 2.413 | 100.0 | 100.0 | | 100.0 | 100.0 | 2.428 | 100 | 100 |

Figure 9:
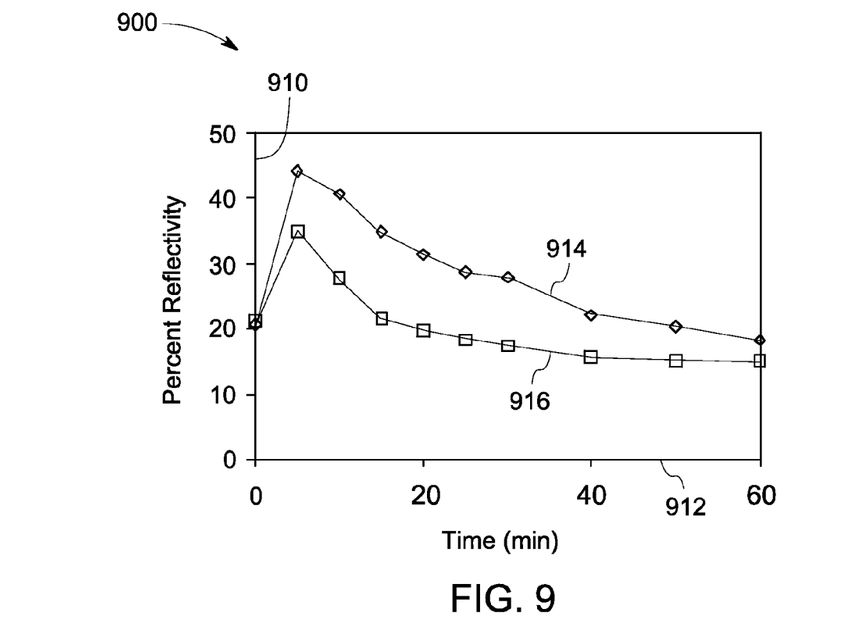
FIG. 9 shows a change in the percent reflectivity of an optical article in accordance with an embodiment described herein.
Figure 10:
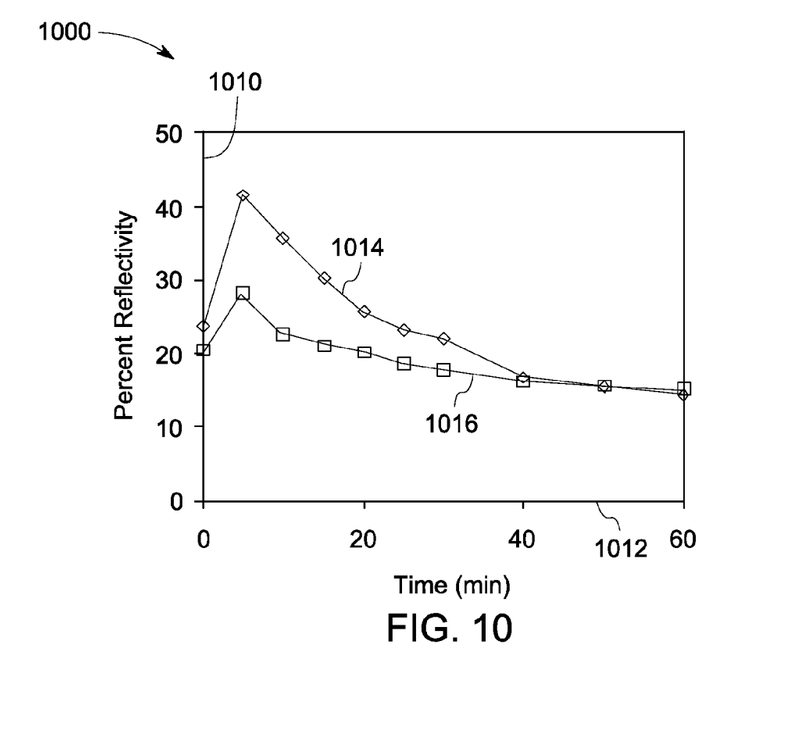
FIG. 10 shows a change in the percent reflectivity of an optical article in accordance with an embodiment described herein.

Thermochromic coating compositions of these formulation was prepared by spin coating on a DVD at 2000 RPM for 30 seconds to produce a dark purple/blue coating that was less than 1 micron thick. The coatings were allowed to dry at room temperature for about 16 hours before being placed in an over and subjected to a temperature of about 100 degrees Celsius. Referring to FIG. 9 and FIG. 10, graphs 900, 1000 showing the change in the optical absorbance of the coatings on the DVD at 650 nanometers at 5 minute intervals of heating are illustrated. The percent reflectivity is plotted on the Y-axis 910, 1010 and the time is plotted on the X-Axis 912, 1012. There is an initial increase in the percent reflectivity in the first 5 minutes of heating indicated by the plots 914, 1014 of the graphs due to the production of acid in the coatings from the thermally latent acid, resulting in a change in the pH. There is a subsequent decrease in the percent reflectivity as the coatings are heated further as a result of the change in pH of the coating due to the production of additional acid from the thermally latent acid as indicated by the plots. The thermochromic coating compositions prepared using the thermochromic ink compositions of Example 4 to 7 represent a one-dye component system that undergo a change in optical absorbance from a first to a second to a third state when a change in pH occurs in the coating when the coating is subjected to a thermal stimulus. As discussed above, the DVD coated with these coating compositions may be rendered playable when the DVD is activated in a controlled manner by an authorized person, say for example, by a store personnel at POS. Thus if the DVD is subjected to a controlled activation signal the DVD may undergo a change form the first state to a second state. However if an unauthorized person, say for example, a shoplifter, tries to get the DVD activated by heating the DVD, the DVD may be rendered unplayable as the thermochromic coating may transform to the third state that may render the DVD unplayable on account of overheating by the unauthorized person.

Example 8

Provides a Thermochromic Ink Composition and a Method for Preparing the Same

A 20 milliliters vial was charged with 197 milligrams (mg) bromothymol blue, 148 mg a thermal acid generator K3 chemical name, 142 mg of dicyclohexylamine, 1.07 g of Dowanol DAA and 1.07 g of Dowanaol DPM, and 4.511 g of acrylate Hexion 9-111 (Hexion Specialty Chemicals Inc). The resultant mixture was stirred for about 5 minutes at room temperature of about 25 degrees Celsius to provide a blue colored thermochromic ink composition. The ink had a viscosity of approximately 20 cPs when measured using a Brookfield DVII+ viscometer.

Thermochromic coating composition prepared using the ink composition prepared in Example 8 and in Example 1 were spin coated on a DVD using the technique described above. The coatings were cured using ultraviolet light in five 3-second bursts. The stability of the coatings were tested using the following methods. A wash-off test was performed for one set of coatings of the ink composition of Example 8 and of Example 1. The coatings were wiped using a cotton swab soaked in isopropyl alcohol. Similarly for both the coatings, a chemical bleaching test was performed using a swab dipped in vinegar. The swab dipped in vinegar was rubbed across the surface of the mark 5 to 10 times. The DVD's were air-dried and the reflectivity measured using a fiber optic Ultraviolet-visible spectrometer (Ocean Optics Inc.) in reflectance mode.

TABLE 5

| Tests Performed | Percent Relectivity | |
|---|---|---|
| | Example 1 | Example 8 |
| Initial reflectivity | 23 | 22 |
| Isopropyl alcohol swab test | 85 | 58 |
| Vinegar swab test | 79 | 49 |

As can be seen by the results provided Table 5, the curable ink maintained a lower reflectivity than the standard ink after the swab tests, indicating that the solvents are not capable of completely washing off the marks disposed using the curable inks to the extent that they are capable of washing off the marks disposed using the standard ink.

Example 9

Provides a Thermochromic Ink Composition and a Method for Preparing the Same

The thermochromic ink coating disposed on the DVD in Example 9 was further overcoated with a curable acrylate coating UVHC8558 (a blend of trimethylol propane triacrylate and hexamethylene diacrylate from GE Silicones). Two milliliters of the overcoat was deposited around the hub at the center of the disc and the disc was then spun at 7000 rpm for 70 seconds. The overcoat was cured using ultraviolet light for 3 seconds. The thickness of the coating was 0.9 micrometer coating as determined by surface profilometry. The chemical tests were performed as described in Example 8 and the results are found in Table 6.

TABLE 6

| Tests Performed | Percent Relectivity | |
|---|---|---|
| | Example 1 | Example 9 |
| Initial reflectivity | 23 | 18.5 |
| Isopropyl alcohol swab test | 85 | 18.8 |
| Vinegar swab test | 79 | 19.1 |

As can be seen by the results provided Table 6, the overcoated curable ink marks maintained a lower reflectivity than the non-overcoated curable ink marks disposed over the DVD, after the swab tests. This indicates that use of the overcoat minimized the capability of the solvent/acid in washing off the overcoated marks when compared to the non-overcoated marks disposed using the curable inks.

Example 10 to 12

Provide Thermochromic Ink Compositions and a Method for Preparing the Same

Three thermochromic ink compositions were prepared using the components included in Table 7 below. A 20 milliliters vial was charged with a dye (bromothymol blue in Examples 10 and 11, monosodium salt of bromothymol blue in Example 12), a thermal acid generator, a base, a polymer, a solvent, an optional pigment, and an optional plasticizer. The resultant mixture was stirred magnetically for 10 minutes. The ink compositions were ink-jet printed using a Dimatix DMP 2800 ink-jet printer and dried in air in the dark for about 16 hours. The dried coatings were then overprinted with a 5 weight percent PMMA solution consisting of solvents Dowanol DAA and Dowanol DPM in equal parts. 10 microliters of dicyclohexylamine was included to adjust the pH of the PMMA solution to between 8 and 10. The coatings were then dried overnight in air and in the dark. Finally the marks were tested using the swab tests as described in Example 8 above. Additionally, a swab test using methanol was also conducted. The results of the test are included in Table 8 below

TABLE 7

| | Weight Percent in the ink Composition | | |
|---|---|---|---|
| Components | Example 10 | Example 11 | Example 12 |
| Dye | 3.9 | 4.0 | 4.6 |
| Base | 2.9 | 2.9 | 2.9 |
| Acid generator | 3.0 | 0.0 | 0.8 |
| Plasticizer | 0 | 1.1 | 0 |
| Pigment | 0 | 0 | 1.0 |
| Polymer | 5.4 | 4.4 | 6.2 |
| Solvent | 84.8 | 87.5 | 84.4 |

TABLE 8

| | Percent reflectivity | | |
|---|---|---|---|
| Test Methods | Example 10 | Exmaple 11 | Example 12 |
| Initial reflectivity | 19 | 10 | 11 |
| IPA swab test | 19 | 10 | 11 |
| Vinegar swab test | 19 | 10 | 11 |
| Methanol swab test | 100 | 100 | 75 |

The results, in Table 8, indicate that the overprinted spots were resistant to isopropanol and vinegar. No measurable change was noted in the percent reflectivity before and after the swab tests. However, when swabbed with methanol the spots were readily removed.

Example 13 to 15

Provides a Thermochromic Ink Composition and a Method for Preparing the Same

The thermochromic ink compositions prepared in Examples 10, 11 and 12 were printed on DVD's. The inks were ink jet printed and dried in air in the dark. The dried marks were then overprinted with a 5 weight percent PMMA solution consisting of solvents Dowanol DAA and Dowanol DPM in equal parts. About 10 microliters trace amount of dicyclohexylamine was included to adjust the pH of the PMMA solution to between 8 and 10. The marks were then dried overnight in air and in the dark. The discs were overcoated by spin coating a curable acrylate hardcoat over the entire surface of the disc as described in Example 9. The coating was cured using a 3 second burst of ultraviolet radiation. Finally the marks were tested using the swab tests as described in Example 8. The results included in Table 9 below indicate that the overprinted spots were resistant to isopropanol, vinegar, and methanol. No measurable change of percent reflectivity was noted in any of the tests.

TABLE 9

| | Percent reflectivity | | |
|---|---|---|---|
| Test Methods | Example 13 | Example 14 | Example 15 |
| Initial reflectivity | 30 | 24 | 16 |
| IPA swab test | 30 | 24 | 16 |

TABLE 9-continued

| | Percent reflectivity | | |
|---|---|---|---|
| Test Methods | Example 13 | Example 14 | Example 15 |
| Vinegar swab test | 30 | 24 | 16 |
| Methanol swab test | 32 | 23 | 16 |

Example 16

Provides a Thermochromic Coating Composition and a Method for Preparing the Same The ink composition described in Example 12 was ink-jet printed using a Dimatix DMP 2800 ink-jet printer and dried in air in the dark for about 16 hours to form a primary mark. The dried mark was then overprinted with a 5 weight percent PMMA solution consisting of solvents Dowanol DAA and Dowanol DPM in equal parts. About 10 microliters trace amount of dicyclohexylamine was included to adjust the pH of the PMMA solution. The overprinted mark was then dried overnight in air in the dark. A secondary mark of a reverse color change ink, was printed on the same disc using the ink composition described in Example 2. The disc was overcoated by spin coating a curable acrylate UVHC8558 hardcoat over the entire surface of the disc. The disc was subjected to a general heating in an oven at temperature of about 100 degrees Celsius. Finally the marks were tested using the swab tests as described in Example 8 above. The results included in Table 10 below indicate that the overprinted spots were resistant to isopropanol, vinegar, and methanol. No measurable change was noted in the reflectivity of any of the marks on the DVD after the swab tests. Generalized heating induced the expected color change in the reverse color change ink generating a blue spot. The unauthorized activation of the disc by heating in an oven caused the reverse color change spot to turn blue signaling an unauthorized activation to the DVD player. If the disc were activated using the authorized heated tag only the primary mark would change color, both spots would be transparent and the DVD player would register an authorized activation.

TABLE 10

| | Percent reflectivity | |
|---|---|---|
| Test Methods | Primary mark | Secondary mark |
| Initial | 39 | 30 |
| Oven test | 68 | 75 |
| IPA swab test | 68 | 75 |
| Vinegar swab test | 68 | 75 |
| Methanol swab test | 68 | 75 |

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An optical article comprising:
a primary mark and a secondary mark disposed on a data storage region of an optical data layer;

wherein the primary mark comprises a first optical-state change material and the secondary mark comprises a second optical-state change material;

wherein the optical article is configured to be transformed from a pre-activated state to an activated state when a localized authorized activation method is selectively applied to the primary mark and not to the secondary mark resulting in the first optical-state change material changing from opaque to transparent; and wherein the optical article is configured to be transformed from the pre-activated state to a deactivated state when a non-localized unauthorized activation method is applied to the secondary mark along with the primary mark resulting in the first optical-state change material changing from opaque to transparent and the second optical-state change material changing from transparent to opaque;

wherein the primary mark or the secondary mark is disposed using a thermochromic ink composition comprising a halochromic optical-state change material, at least one base, at least one solvent, and at least one binder material; wherein the pH of the thermochromic ink composition is such that the halochromic optical-state change material remains in its basic state until it is acted upon by a thermal stimulus; and wherein the thermochromic ink composition is capable of transforming from a first optical state to a second optical state upon a change in pH caused by exposure to a thermal stimulus.

2. The optical article as defined in claim 1, wherein the localized authorized activation method comprises selectively applying to the primary mark one or more activation signals selected from a laser, thermal energy, infrared rays, X-rays, gamma rays, microwaves, visible light, ultraviolet light, ultrasound waves, radio frequency waves, electrical energy, chemical energy, magnetic energy, and mechanical energy.

3. The optical article as defined in claim 1, wherein the primary mark is disposed in a discrete area of the optical article, a continuous layer extending across a portion of the optical article, or a patterned layer extending across a portion of the optical article.

4. The optical article as defined in claim 3, wherein the primary mark is disposed in a discrete area of the optical article in the geometry of an arc with a length and a width; wherein the length is longer than the width.

5. The optical article as defined in claim 1, wherein the pre-activated state of the optical article is characterized by at least one portion of the optical article having a reflectivity of less than about 20 percent relative to a reflectivity of the at least one portion of the optical article in the activated state.

6. The optical article as defined in claim 1, wherein the optical article is one or more selected from a CD, a DVD, a HD-DVD, a high capacity storage medium, a near field optical storage disc, a holographic storage medium, a volumetric optical storage medium, an identification card, a passport, a payment card, a driving license, and a personal information card.

7. The optical article as defined in claim 1, wherein the change in pH of the coating is due to a change in concentration of the at least one base within the thermochromic ink composition.

8. The optical article as defined in claim 7, wherein the change in pH of the thermochromic ink composition is due to a change in concentration of the at least one base within the thermochromic ink composition due to evaporation, sublimation, or degradation of the at least one base.

9. The optical article as defined in claim 8, wherein the change in concentration of the at least one base within the thermochromic ink composition is irreversible.

10. A system, comprising:
an optical article comprising a primary mark and a secondary mark disposed on a data storage region of an optical data layer, wherein the primary mark comprises a first optical-state change material and the secondary mark comprises a second optical-state change material;

an activation device configured to focus an activation signal on a restricted area of the optical article including the primary mark and not the secondary mark, wherein the optical article is configured to be transformed from a pre-activated state to an activated state when the activation device selectively applies the activation signal to the primary mark to activate the primary mark and change the primary mark from opaque to transparent, and wherein the optical article is configured to be transformed from a pre-activated state to a deactivated state when the activation signal is applied to activate the secondary mark along with the primary mark resulting in the second optical-state change material changing from transparent to opaque;

wherein the primary mark or the secondary mark is disposed using a thermochromic ink composition comprising a halochromic optical-state change material, at least one base, at least one solvent, and at least one binder material; wherein the pH of the thermochromic ink composition is such that the halochromic optical-state change material remains in its basic state until it is acted upon by a thermal stimulus; and wherein the thermochromic ink composition is capable of transforming from a first optical state to a second optical state upon a change in pH caused by exposure to a thermal stimulus.

11. The system of claim 10, wherein the primary mark is disposed in a discrete area of the optical article, a continuous layer extending across a portion of the optical article, or a patterned layer extending across a portion of the optical article.

12. The system of claim 10, wherein the primary mark is disposed in a discrete area of the optical article in the geometry of an arc with a length and a width; wherein the length is longer than the width.

13. The optical article as defined in claim 1, comprising at least one protective layer disposed over the primary mark and the secondary mark, wherein the protective layer is configured to be transparent to a localized authorized activation method or a non-localized unauthorized activation method.

14. An optical article comprising:
a primary mark and a secondary mark disposed on a data storage region of an optical data layer;

wherein the primary mark comprises a first optical-state change material and the secondary mark comprises a second optical-state change material;

wherein the optical article is configured to be transformed from a pre-activated state to an activated state when a localized authorized activation method is selectively applied to the primary mark and not to the secondary mark resulting in the first optical-state change material changing from transparent to opaque; and wherein the optical article is configured to be transformed from the pre-activated state to a deactivated state when a non-localized unauthorized activation method is applied to the secondary mark along with the primary mark resulting in the first optical-state change material changing from transparent to opaque and the second optical-state change material changing from opaque to transparent;

wherein the primary mark or the secondary mark is disposed using a thermochromic ink composition comprising a halochromic optical-state change material, at least one base, at least one solvent, and at least one binder material; wherein the pH of the thermochromic ink composition is such that the halochromic optical-state change material remains in its basic state until it is acted upon by a thermal stimulus; and wherein the thermochromic ink composition is capable of transforming from a first optical state to a second optical state upon a change in pH caused by exposure to a thermal stimulus.

15. A system, comprising:
an optical article comprising a primary mark and a secondary mark disposed on a data storage region of an optical data layer, wherein the primary mark comprises a first optical-state change material and the secondary mark comprises a second optical-state change material;
an activation device configured to focus an activation signal on a restricted area of the optical article including the primary mark and not the secondary mark, wherein the optical article is configured to be transformed from a pre-activated state to an activated state when the activation device selectively applies the activation signal to the primary mark to activate the primary mark and change the primary mark from transparent to opaque, and wherein the optical article is configured to be transformed from a pre-activated state to a deactivated state when the activation signal is applied to activate the secondary mark along with the primary mark resulting in the second optical-state change material changing from opaque to transparent;

wherein the primary mark or the secondary mark is disposed using a thermochromic ink composition comprising a halochromic optical-state change material, at least one base, at least one solvent, and at least one binder material; wherein the pH of the thermochromic ink composition is such that the halochromic optical-state change material remains in its basic state until it is acted upon by a thermal stimulus; and wherein the thermochromic ink composition is capable of transforming from a first optical state to a second optical state upon a change in pH caused by exposure to a thermal stimulus.

* * * * *